Jan. 12, 1971          C. W. WILLIAMS          3,553,978
COMPOSITE PROPELLER SHAFT CONSTRUCTION AND METHOD OF MAKING
Original Filed June 7, 1967
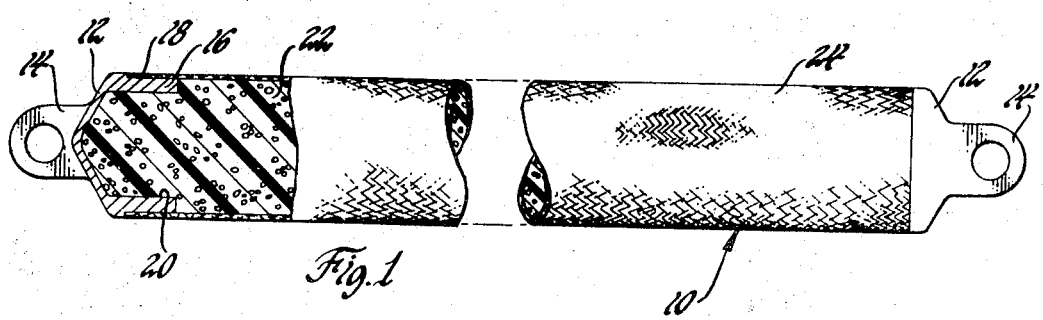
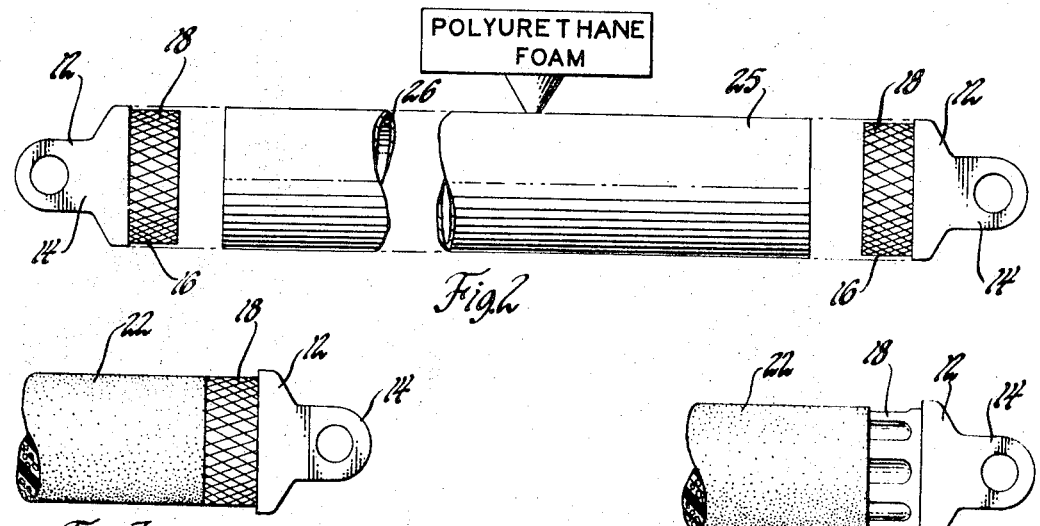
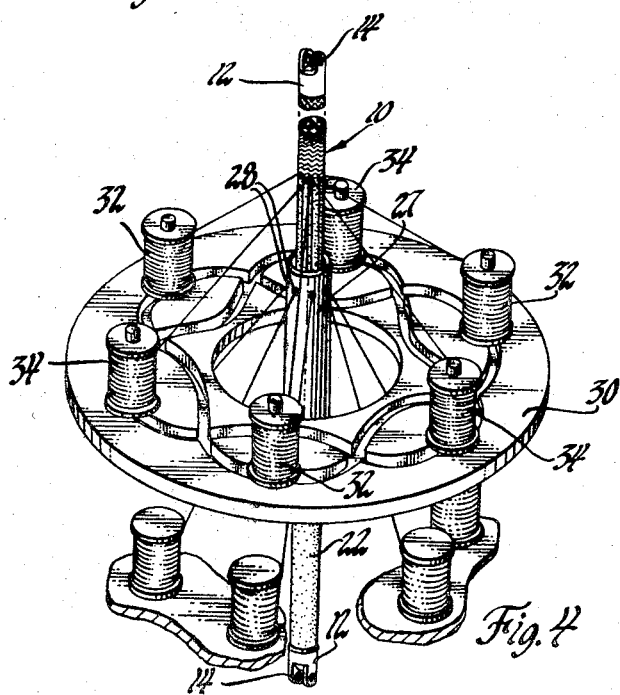
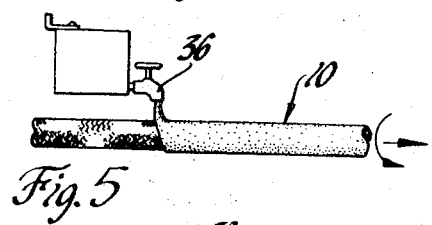
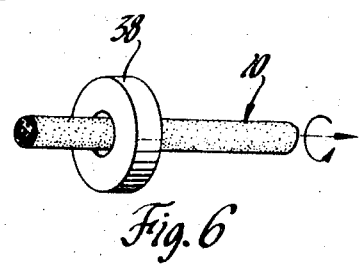
INVENTOR
*Charles W. Williams*
BY
*Robert J. Outland*
ATTORNEY 3,553,978
COMPOSITE PROPELLER SHAFT CONSTRUCTION
AND METHOD OF MAKING
Charles W. Williams, Essexville, Mich., assignor to General Motors Corporation, a corporation of Delaware
Original application June 7, 1967, Ser. No. 644,184. Divided and this application Oct. 6, 1969, Ser. No. 871,091
Int. Cl. F16c 3/02
U.S. Cl. 64—1    4 Claims

ABSTRACT OF THE DISCLOSURE

A vehicle propeller shaft includes a pair of spaced end members having inner ends with characterized surfaces. A light but stiff cylindrical arbor, such as of polyurethane foam, connects the end members and a tube formed of hardened thermosetting resin reinforced with fiber glass filaments is formed on the arbor and interlockingly engages the characterized surfaces of the end members. A method of forming such a shaft includes steps of forming a polyurethane foam arbor between the end members and forming the resin bonded fiber glass tube in place on the arbor and end members.

---

This application is a division of application Ser. No. 644,184, filed June 7, 1967.

This invention relates generally to propeller shafts for the transmission of power and more particularly to the construction and method of making a novel propeller shaft adapted to be mounted between universal joints of a motor vehicle drive train.

Propeller shafts for motor vehicles have for many years been commonly constructed from a steel tubular member welded between the connecting yokes of universal joints or other suitable end members. In order to provide sufficient stiffness in both torsion and bending, tubes of substantial thickness and diameter have been required which have not only added substantial weight to the vehicle but, addition, have required care in manufacture and proper balancing to avoid undesirable vibration problems.

It is, accordingly, an object of the present invention to provide an improved propeller shaft construction combining features of light weight and high critical vibration speed.

It is a further object of my invention to provide a method of manufacturing a propeller shaft having improved properties.

These and other objects of the invention will be more clearly understood from the following description of a preferred embodiment of a propeller or drive shaft according to the invention and a method of forming same wherein:

FIG. 1 is a plan view of a drive shaft according to the invention partially broken away to show certain details of interior construction;

FIG. 2 is a view partially diagrammatic in nature and illustrating the steps in the manufacture of the drive shaft of FIG. 1 comprising forming an arbor between the end members;

FIG. 3 is a fragmentary plan view illustrating the drive shaft of FIG. 1 in a partial state of completion;

FIG. 3a is a view similar to FIG. 3 but showing an alternative embodiment of the end member characterized surfaces;

FIG. 4 is a pictorial view illustrating the step in the manufacture of the drive shaft of FIG. 1 of applying the layers of glass fibers;

FIG. 5 is a plan view illustrating the step of applying uncured resin to the fiber glass layers of the shaft; and FIG. 6 is a plan view illustrating the step of curing the resin by heating.

Referring now to the drawings in more detail: FIG. 1 discloses a propeller shaft constructed according to the invention and generally indicated by numeral 10. Propeller shaft 10 comprises a pair of spaced end members 12 having ears 14 which are adapted to act as yoke portions of universal joints to which the end members are connectable for the receiving and transmission of torque between members of a vehicle drive train. The end members include inner end portions 16 having outer surfaces 18 which are preferably characterized such as by knurling, as best shown in FIG. 3, or scalloping, as best shown in FIG. 3a. End members members 12 also include inwardly opening axially extending recesses 20 located interiorly of surfaces 18.

Recesses 20 receive the end portions of an arbor 22 formed of a light weight relatively stiff material, such as, for example, polyurethane foam. Arbor 22 extends between the end members and has, except for its end portions, a diameter equal to that of surfaces 18.

Applied on the outer surfaces of arbor 22 and end member surfaces 18 is a torque tube 24 formed of a hardened thermosetting resin reinforced with fiber glass filaments. Tube 24 is preferably formed of a plurality of layers of glass fibers including helically wound woven layers alternating with longitudinally extending fiber layers which give the tube torsional strength and bending strength respectively. The glass fiber layers may be applied by known methods to obtain the desired degree of torsional and bending strength in accord with the size and weight of shaft desired. The glass fiber layers are impregnated with known thermosetting resins of suitable strength, for example, epoxy resin which is hardened by heating to curing temperature.

Referring to FIGS. 2–6, the steps of one method of forming a propeller shaft of the type shown in FIG. 1 are illustrated. In FIG. 2, a pair of end members 12 have been placed in spaced axial relationship and a cylindrical mold, such as split aluminum tube 25, is clamped about outer surfaces 18 so as to connect members 12 and form a cylindrical cavity 26 therebetween. A known foamable urethane formulation is then added to the cavity where it is foamed and cured to a rigid low density polyurethane foam within cavity 26 and recesses 20 of members 12 to form a light but stiff cylindrical arbor 22 connecting the members as shown in FIG. 3.

Next, alternate layers of longitudinally extending and helically woven glass fibers are applied to the outer surface or arbor 22 and surfaces 18 of end members 12. Any suitable means of making such application may be utilized, one such means being disclosed in FIG. 4. In this method, the end member and arbor assembly is moved upwardly through a tubular member 27 which includes apertures 28 through which glass fibers are fed to produce a layer of longitudinally oriented glass fibers along the outer surface of the arbor and end members. Surrounding tube 27 is a table 30 on which clockwise and counterclockwise moving spools 32 and 34 are respectively moved in undulating paths in a known manner to form a braided layer of fiber glass filaments on the propeller shaft over the longitudinal layer previously applied. This process may be repeated any desired number of times to obtain the desired number of layers of longitudinal and braided fiber glass filaments.

Following the application of the fiber glass layers, they are impregnated with a suitable thermosetting resin, such as epoxy, as is indicated by FIG. 5. The shaft 10 may be rotated during application of the resin. If desired, this step may be alternated with the previous wrapping step to provide for impregnating of a layer or group of fiber glass layers after each is applied. Suitable dispensing means 36 are utilized to apply the liquid resin to the layer or layers of fiber glass filaments.

By the use of proper equipment it is also possible to apply the resin to the fiberglass filament before the wrapping step takes place so that, upon wrapping the filament in the desired pattern on the propeller shaft arbor and end members, the interstices are at once filled with uncured resin with the excess being squeezed out by the wrapping process.

Following the wrapping and impregnating steps the shaft assembly is passed through a heater 38 in which the thermosetting resin is cured and hardened. In order to avoid deformation of the shaft in the curing process, it may be rotated while being moved through the curing oven. Alternatively, if desired, the shaft may be hung vertically during the curing process so that no bending moments are applied to the shaft length while it is being cured.

From the wrapping, impregnating and curing processes, the depressions in the characterized surfaces 18 of the end members are filled with portions of fiber glass filaments and hardened resin. This forms a strong interlocking engagement between the tube 24 and end members 12 so that the transmission of torque loads therethrough will not easily break the bonds between them. The helically wound fiber glass strands transmit torque loading passing through the shaft between the end members, while the longitudinally extending strands absorb bending loads and hold the shaft relatively straight in its applied position. The main purpose of the arbor 22 is its use in the manufacture of the shaft in obtaining a straight tube joining the end members; however, it remains in place after assembly and serves to stiffen the tube slightly without adding undue weight to the assembly.

By the above method, a drive shaft is constructed in which the light weight of the tube as well as the high strength and low elasticity of the glass filaments results in a propeller shaft having a high degree of strength in proportion to its weight as well as a high critical speed of vibration. This makes the shaft useful in high speed drive line applications and reduces the balancing problems in such applications. An additional advantage is that the resin bonded fiber glass tube is not subject to oxidation attacks as are steel tubes and thus may be especially useful in applications where corrosive conditions exist.

The method of forming the fiber glass tube in place on the arbor and characterized surfaces of the end members is also advantageous in that a much better and stronger bond is formed between the tube and the end members than can be accomplished where the tube is formed on a separate removable arbor and afterward bonded to the end members to form a propeller shaft. The use of polyurethane foam as an arbor makes a relatively inexpensive and light weight construction; however, it is within the scope of my invention to utilize as an arbor any other suitably stiff, light weight and inexpensive material as an arbor on which to form the fiber glass tube.

While my invention has been described by the use of a particular embodiment and method chosen for purposes of illustration, numerous changes may be made by those skilled in the art within the scope of the inventive concept disclosed and it is, accordingly, desired that the invention not be limited except by the language of the following claims.

I claim:
1. A composite propeller shaft comprising
   a pair of spaced torque transmitting end members connectable with driving and driven means respectively,
   a light but relatively stiff cylindrical arbor connecting said end members and
   a fibrous resin bonded tube formed around said arbor and extending around portions of said end members, said tube being secured to said end members to transmit torque therebetween.
2. A composite propeller shaft comprising
   a pair of spaced torque transmitting end members connectable with driving and driven means respectively, said end members including axially aligned generally cylindrical inner end portions having characterized surfaces
   a light but relatively stiff cylindrical arbor axially aligned with and connecting said inner end portions and
   a resin bonded fiber glass tube formed in place on said arbor and said end portions, said tube interlockingly engaging the characterized surfaces of said end portions to form a strong connection for the transmission of torque between said end members through said tube.
3. The combination of claim 2 wherein said tube includes both helically and longitudinally oriented fiber glass filaments to provide strength in torsion and bending modes respectively.
4. The combination of claim 3 wherein said arbor is formed of a polyurethane foam material.

References Cited

UNITED STATES PATENTS 3,043,120    7/1962    Waldron _____ 64—2

FRED C. MATTERN, JR., Primary Examiner

R. HEALD, Assistant Examiner